(12) United States Patent
Kroll et al.

(10) Patent No.: US 7,252,593 B2
(45) Date of Patent: *Aug. 7, 2007

(54) TORSIONAL-VIBRATION DAMPER (75) Inventors: Juergen Kroll, Goslar (DE); Norbert Bastel, Obernhausen (DE); Till Ebner, Pfungstadt (DE)

(73) Assignee: BorgWarner Inc., Auburn Hills, MI (US)

( * ) Notice: Subject to any disclaimer, the term of this patent is extended or adjusted under 35 U.S.C. 154(b) by 40 days.

This patent is subject to a terminal disclaimer.

(21) Appl. No.: 10/886,180

(22) Filed: Jul. 7, 2004

(65) Prior Publication Data
US 2005/0026704 A1 Feb. 3, 2005

(30) Foreign Application Priority Data
Jul. 7, 2003 (EP) .................................. 03015283
Sep. 9, 2003 (EP) .................................. 03020329

(51) Int. Cl.
*F16F 16/129* (2006.01)
(52) U.S. Cl. .................................... 464/68.41
(58) Field of Classification Search ............... 464/68.4, 464/68.41; 192/214.1, 214
See application file for complete search history.

(56) References Cited

U.S. PATENT DOCUMENTS

| 2,855,767 | A |   | 10/1958 | Ahlen |
|---|---|---|---|---|
| 4,190,142 | A | * | 2/1980 | Berlioux .................. 192/214.1 |
| 4,353,444 | A |   | 10/1982 | Bionaz |
| 4,626,226 | A | * | 12/1986 | Kajikawa et al. .... 464/68.41 X |
| 4,697,682 | A | * | 10/1987 | Alas et al. ............... 464/68.41 |
| 4,787,612 | A | * | 11/1988 | Ball et al. ............. 464/68.41 X |
| 4,871,342 | A |   | 10/1989 | Boss et al. |
| 5,597,355 | A |   | 1/1997 | Morishita et al. |
| 6,536,575 | B1 |   | 3/2003 | Lory et al. |

FOREIGN PATENT DOCUMENTS

| DE | 43 27 017 A1 | 8/1993 |
|---|---|---|
| DE | 43 07 133 A1 | 10/1993 |
| DE | 44 18 390 A1 | 5/1994 |
| DE | 196 02 459 | 1/1996 |
| DE | 101 15 454 A1 | 8/2002 |
| DE | 101 49 704 A1 | 4/2003 |
| EP | 0 610 979 A1 | 8/1994 |
| EP | 0 641 956 | 9/1994 |
| EP | 0 826 899 | 3/1998 |
| EP | 0 922 878 A2 | 6/1999 |
| EP | 1 176 339 A2 | 1/2002 |
| JP | 07259925 | 10/1995 |

* cited by examiner

*Primary Examiner*—Greg Binda
(74) *Attorney, Agent, or Firm*—Greg Dziegielewski; Bliss McGlynn, P.C.

(57) ABSTRACT

A torsional-vibration damper rotatably supported for translating torque between a prime mover and the input of a transmission that includes a primary element operatively connected for rotation with the power take off of a prime mover and a secondary element operatively connected for rotation with the input to a transmission. A spring mechanism is operatively disposed between the primary element and the secondary element that is adapted to operatively couple the primary element to the secondary element in a damped torque translational relationship. The torsional-vibration damper also includes a friction device having a plurality of friction blocks that are each operatively supported between the primary element and the secondary element such that the friction blocks provide frictional contact between the primary element and the secondary element.

6 Claims, 6 Drawing Sheets

TORSIONAL-VIBRATION DAMPER

BACKGROUND OF THE INVENTION

1. Field of the Invention

The present invention relates, generally, to torsional-vibration dampers for motor vehicles.

2. Description of the Related Art

A torsional-vibration damper is, generally, a type of elastic coupling disposed between two components of a drive train of a vehicle, for example, between an internal-combustion engine and a transmission. Such devices reduce or otherwise prevent vibrations from being transmitted from the engine to other parts of the drive train.

The basic embodiment of a torsional-vibration damper includes a primary element and a secondary element that can be coupled to each other by a spring device and are limited in movement in relation to each other about a rotational axis. The spring device advantageously includes a plurality of springs disposed on a radial arc spaced relative to the rotational axis and, preferably, at a certain uniform distance from each other. The springs, or a sequence of multiple springs, if applicable, are then connected to the primary element on one side of the springs and to the secondary element on the other side of the springs. Torque is transmitted through the spring coupling, and, as a result of the spring characteristic, a certain additional damping effect is achieved.

When torsional-vibration dampers are used in the drive train, however, it is necessary to have a high moment of friction in the drive train to decrease the vibration amplitudes in the resonance range. Unfortunately, this causes the transmission characteristic to deteriorate in higher speed range.

In response to this problem a torsional-vibration damper has been developed in the related art that includes primary and secondary elements coupled not only by the spring device, but additionally via a friction device whose damping effect can be controlled and adjusted by a special force-generating device. The friction device can also be engaged and disengaged in the manner of a clutch.

Although the torsional-vibration dampers known in the related art are basically effective in solving this problem, they have distinct disadvantages. In particular, they are often physically complex and also require a separate control system. The control system operatively controls the friction device to selectively provide the desired controlled moment of friction given the specific operating conditions at the time. The inherent complexity of both the friction device and its control system results in a torsional-vibration damper that can be cost prohibitive. Therefore, the manufacturing costs of many such devices are considered too high for many applications.

Thus, there remains a need in the art for a torsional-vibration damper having a friction device that provides a controlled moment of friction. In particular, there remains a need in the art for torsional-vibration damper that employs a simple friction device to provide a damping effect that does not need a separate control system and can be produced cost-effectively.

SUMMARY OF THE INVENTION

The present invention overcomes the disadvantages in the related art in a torsional-vibration damper rotatably supported for translating torque between a prime mover and the input of a transmission that includes a primary element operatively connected for rotation with the power take off of a prime mover and a secondary element operatively connected for rotation with the input to a transmission. A spring mechanism is operatively disposed between the primary element and the secondary element that is adapted to operatively couple the primary element to the secondary element in a damped torque translational relationship. The torsional-vibration damper also includes a friction device having a plurality of fiction blocks that are each operatively supported between the primary element and the secondary element such that the friction blocks provide frictional contact between the primary element and the secondary element.

One advantage of the torsional-vibration damper of the present invention is that the friction device is simple and inexpensive to produce.

Another advantage of the torsional-vibration damper of the present invention is that the by varying the size of the friction elements the predetermined relative friction moment force of the friction device is easily changeable in production.

Another advantage of the torsional-vibration damper of the present invention is that it requires few separate components.

Other objects, features, and advantages of the present invention will be readily appreciated, as the same becomes better understood while reading the subsequent description taken in conjunction with the accompanying drawings.

DETAILED DESCRIPTION OF THE INVENTION

Figures 1A, 1B:
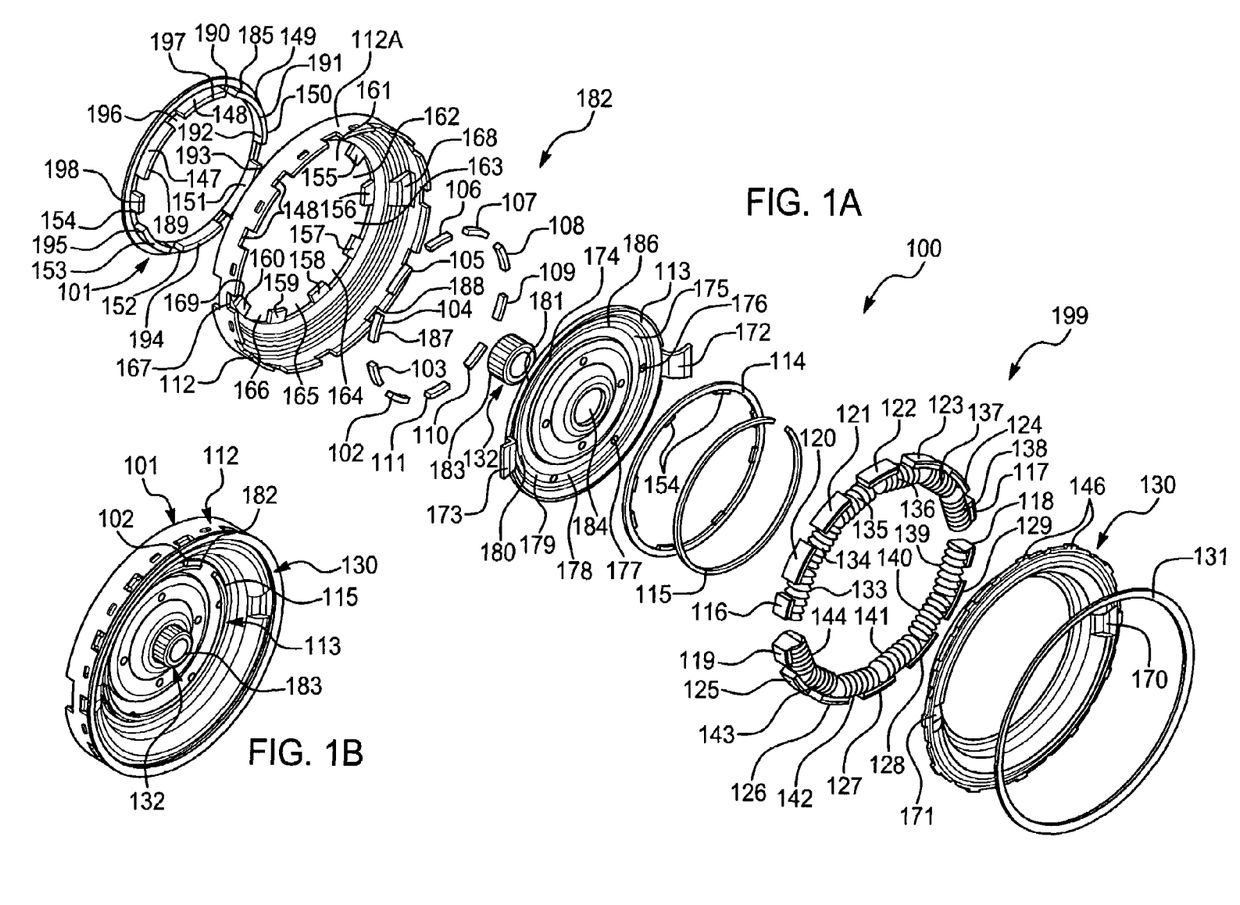
FIG. 1A is an exploded view of a one embodiment of a torsional-vibration damper of the present invention.
FIG. 1B is a perspective view of the torsional-vibration damper of the present invention as shown in FIG. 1A.
Figure 2:
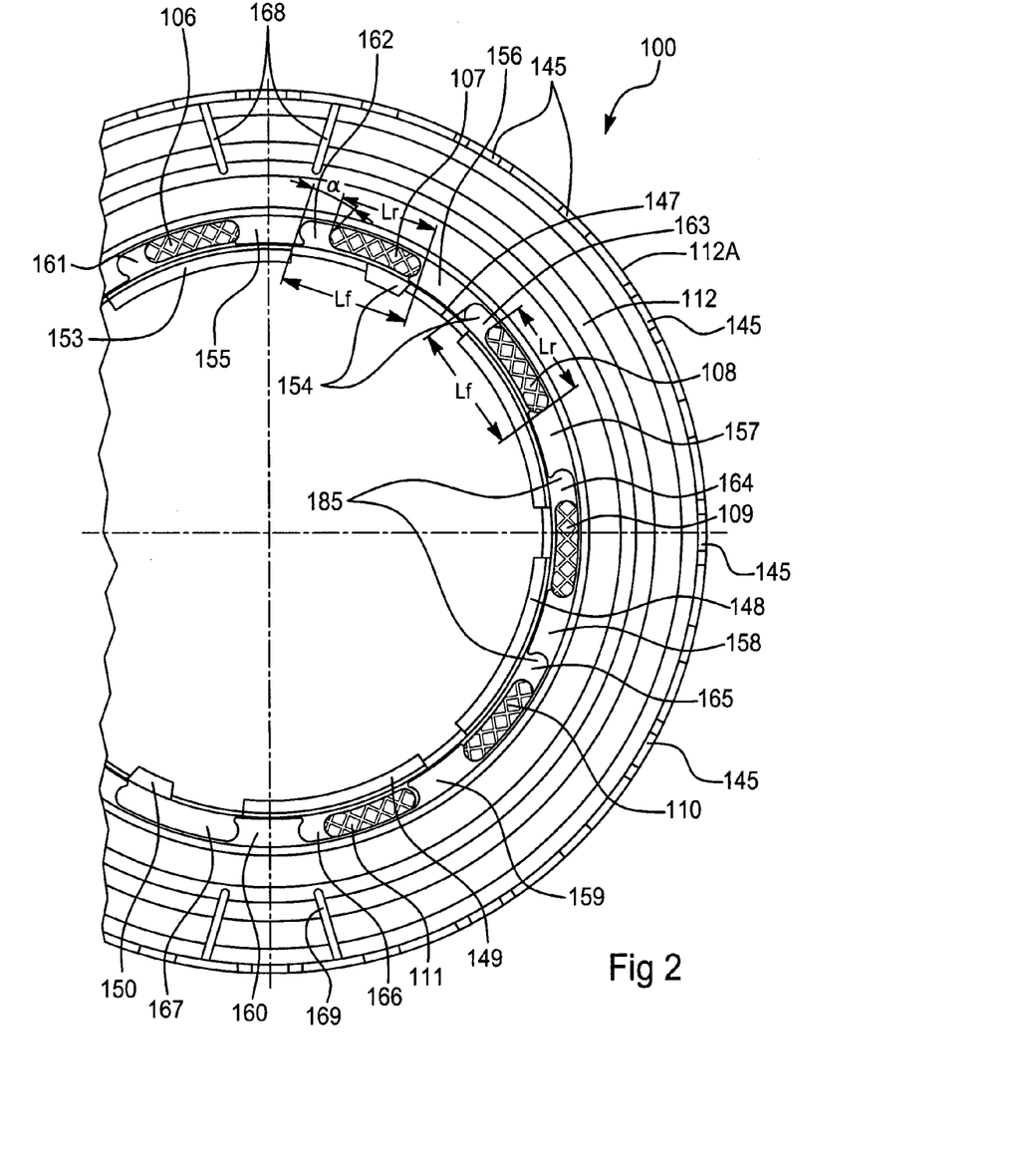
FIG. 2 is a partial top view of a drive-side holding plate that may be employed with the torsional-vibration damper of the present invention as shown in FIG. 1A.

Referring now to FIGS. 1A, 1B, and 2, where like numerals are used to designate like structure, a first embodiment of the torsional-vibration damper of the present invention is generally indicated at 100. In its operational mode, the torsional-vibration damper 100 is rotatably supported for translating torque between a prime mover and the input of a transmission. The torsional-vibration damper 100 includes a primary element, a secondary element and a damping mechanism. The primary element is illustrated herein as a hub plate 113, which is adapted to be operatively connected for rotation with the power take off of a prime mover (not shown). For purposes of illustration, the output shaft of such a device is generally indicated at 132 by a portion of a splined shaft 183. The splined shaft 183 may be operatively connected to an internal-combustion engine or other motor, for example. The splined shaft 183 of the drive device is received and retained by an axially centered opening 184 in the hub plate 113 that is cooperatively splined.

The secondary element includes a first member and a second member. The first and second members are holding members also referred to as plates. More specifically, the secondary element of the torsional-vibration damper 100 of the present invention includes a drive-side holding member or plate 112 and an output-side holding member or plate 130. The holding plates 112 and 130 are so named for their function of holding the damping mechanism between them and their position in the secondary element. More precisely, torque is provided to the drive-side holding plate 112 from the hub plate 113 through the damping mechanism and then delivered to a subsequent power transfer or transmission device (not shown) that is operatively connected to the output-side holding plate 130.

Referring to FIGS. 1A, 1B, and 2, the damping mechanism includes a friction device, generally indicated at 182, and a spring mechanism, generally indicated at 199. Generally speaking, the friction device 182 includes a plurality of friction blocks that are each operatively supported between the primary element and the secondary element such that the friction blocks frictionally join the primary element with the secondary element. More specifically, the friction device 182 includes an annular ring formed generally as a disc that serves as a support member or plate 101. Along the inner circumference of the support plate 101 are axially extending ridges 147, 148, 149, 150, 151, 152, 153, and 154 that are turned radially inward at their ends to form the radial support ridges 189, 190, 191, 192, 193, 194, 195, and 196.

Formed on the inner circumference of the drive-side holding plate 112 are a series of recesses or apertures 161, 162, 163, 164, 165, 166, and 167. The formation of the apertures creates radial ridges 155, 156, 157, 158, 159, and 160. The support plate 101 is operatively disposed to the drive-side holding plate 112 such that the axially extending ridges 147, 148, 149, 150, 151, 152, 153, and 154 and the radial support ridges 189, 190, 191, 192, 193, 194, 195, and 196 of the support plate 101 fit within, and extend axially beyond the inner diameter of the radial ridges 155, 156, 157, 158, 159, and 160 of the drive-side holding plate 112.

As best shown in FIG. 2, friction blocks 102, 103, 104, 105, 106, 107, 108, 109, 110, and 111 are operatively disposed upon the axially extending ridges 147, 148, 149, 150, 151, 152, 153, and 154 of the support plate 101 so that they fit within the open areas created by the interaction of the apertures 161, 162, 163, 164, 165, 166, and 167 and the radial ridges 155, 156, 157, 158, 159, and 160 of the drive-side holding plate 112. In this manner, the friction blocks 102, 103, 104, 105, 106, 107, 108, 109, and 111 can move within the apertures 161, 162, 163, 164, 165, 166, and 167 in a circumferential orientation up to the limits of the sides of the next respective radial ridge 155, 156, 157, 158, 159, or 160.

Furthermore, the disc-shaped hub plate 113 also includes a series of circumferentially oriented apertures 174, 175, 176, 177, 178, 179, 180, and 181. The hub plate 113 is operatively disposed within the drive-side holding plate 112 such that the radial support ridges 189, 190, 191, 192, 193, 194, 195, and 196 of the support plate 101 are received by and extend through the hub plate apertures 174, 175, 176, 177, 178, 179, 180, and 181. However, the hub plate apertures 174, 175, 176, 177, 178, 179, 180, and 181 are generally slot-shaped and do not allow the friction blocks 102, 103, 104, 105, 106, 107, 108, 109, 110, and 111 to pass through. In other words, the friction blocks 102, 103, 104, 105, 106, 107, 108, 109, 110, and 111 are radially captured between support ring 101 and the hub plate 113. More specifically, the support ring 101 and the hub plate 113 have friction surfaces 185 and 186 respectively that interact with the axial ends 187 and 188 of the friction blocks 102, 103, 104, 105, 106, 107, 108, 109, 110, and 111.

To achieve the desired axial frictional interaction between the hub plate 113, the support plate 101, and friction blocks 102, 103, 104, 105, 106, 107, 108, 109, 110, and 111, the support plate 101 includes a biasing member to cause the hub plate 113 to be axially biased toward the support plate 101. In the preferred embodiment illustrated here, the biasing member is a disk spring 114 that is retained by a locking ring 115. The disk spring 114 is disposed against the hub plate 113 and includes a series of tabs 154 at its inner diameter. The series of tabs 154 are formed having a deflection toward the hub plate 113. The disk spring 114 fits within the inner diameter of the radial support ridges 189, 190, 191, 192, 193, 194, 195, and 196 of the support plate 101 that extend through the slotted hub plate apertures 174, 175, 176, 177, 178, 179, 180, and 181.

The locking ring 115 has a larger diameter than the disk spring 114 and is formed of a spring metal material having a split in its circumference. The locking ring 115 is circumferentially compressed to fit within the radial support ridges 189, 190, 191, 192, 193, 194, 195, and 196 of the support plate 101 against the disk spring 114 and then allowed to re-expand to be retained by the radial support ridges. The presence of the locking ring 115 causes the tabs 154 of the disk spring 114 to press against the hub plate 113 and provide the proper axial biasing between the hub plate 113 and support plate 101. This causes a circumferentially-resistive friction force to be present between the friction blocks 102, 103, 104, 105, 106, 107, 108, 109, 110, and 111, the hub plate 113, and the support plate 101.

The hub plate 113 can slightly twist, together with the support plate 101, in relation to the drive-side holding plate 112 by a certain angle, when the relevant friction blocks 102, 103, 104, 105, 106, 107, 108, 109, 110, 111 are not resting against their respective radial ridge 155, 156, 157, 158, 159, or 160. The angle $\alpha$, as shown in FIG. 2, defines the relative distance the hub plate 113 and the frictionally joined support plate 101 may move before the drive-side holding plate 112 is influenced to move. If clearance angle $\alpha$ is exceeded, any further rotation requires overcoming the frictional force acting between the friction surfaces 185, 186, 187, and 188.

As shown in FIG. 2, the apertures 161, 162, 163, 164, 165, 166, and 167 have the same circumferential length $L_f$. The friction blocks 102, 103, 104, 105, 106, 107, 108, 109, 110, 111 also have the same circumferential length Lr, so that the clearance angles $\alpha$ are the same at each aperture 161, 162, 163, 164, 165, 166, and 167. Thus, the frictional interaction between the support plate 101 and the hub plate 113 is generally applied at the same point in the rotation of the support plate 101 and the hub plate 113 relative to the drive-side holding plate 112. However, it should be appreciated that the friction blocks 102, 103, 104, 105, 106, 107, 108, 109, 110, and 111, or the apertures 161, 162, 163, 164, 165, 166, and 167, or both may be formed having different lengths such that different clearance angles $\alpha$ are created. In this manner, the applied frictional forces and the point of rotation at which they occur may be designed to vary.

It should be appreciated that the material used in the production of the friction blocks discussed herein may be of any variety of resilient materials that provide an adequate transfer of frictional moment force between the primary and secondary elements. This may include any of the typical materials used with friction and abrasion pads such as layered compositions having a metallic core with organic material friction pads, for example. However, it has proven to be advantageous for the present invention to employ friction blocks that contain plastic or that are completely made of plastic. It has proven to be particularly advantageous when the friction blocks employed with the present invention contain a polyamide plastic.

Furthermore, additional benefit has been determined to arise from employing plastic friction blocks that are impregnated with reinforcing fibers. More precisely, plastic friction blocks having embedded reinforcing glass fibers have proven to provide the greatest wear-resistance and provide a high transfer of friction moment force. Therefore, in the preferred embodiment, the friction blocks employed are formed of polyamide plastic having embedded reinforcing glass fibers. Depending upon design criteria for the torsional-vibration damper of the present invention, and the conditions of the operating environment, the predetermined amount of embedded fibers used in the material composition of the friction blocks may vary. In the preferred embodiment, the predetermined amount of embedded glass reinforcing fibers used represents between 40 to 60% of the total composition of the friction blocks. A composition of 50% embedded glass fibers is optimum for most applications.

The damping mechanism of the torsional oscillation damper 100 also includes a spring mechanism 199 that is disposed between the primary element and the secondary element, The spring mechanism 199 is adapted to couple the primary element (hub plate 113) to the secondary element (drive-side and output holding plates 112 and 130). The two elements are limited in movement in relation to each other about a rotational axis. The drive-side holding plate 112 includes an axial rim 112A at its outer circumference that has a series of teeth 145 that operatively engage a series of complementary recesses 146 in the outer circumference of the output-side holding plate 130. Thus, when the output-side holding plate 130 is axially mounted to the drive-side holding plate 112, a disk spring 131 is disposed against the output-side holding plate 130 that captures the teeth 145 of the drive-side holding plate 112 in the recesses 146 of the output-side holding plate 130.

The spring mechanism 199 is disposed between the drive-side holding plate 112 and the output-side holding plate 130 and exerts a damping action parallel to the friction device 182. The spring mechanism 199 includes a series of helical or coil springs 133, 134, 135, 136, 137, 138, 139, 140, 141, 142, 143, and 144 that are arranged, in the circumferential orientation, on the drive-side holding plate 112 between two support brackets 168 and 169. The support brackets 168 and 169 are arranged radially opposite to each other on the drive-side holding plate 112. The coil springs 133, 134, 135, 136, 137, 138, 139, 140, 141, 142, 143, and 144 are held in a series of sliding blocks 116, 117, 118, 119, 120, 121, 122, 123, 124, 125, 126, 127, 128, and 129, which are radially disposed and axially retained within the inside of the axial rim 112A of the drive-side holding plate 112. Furthermore, as shown in FIG. 1A, these sliding blocks are arranged in two spring groups, first 116, 120, 121, 122, 123, 124, and 117, and second 119, 125, 126, 127, 128, 129, and 118. These two groups of coil springs are supported at their end-most sliding blocks 116, 117, 118, and 119 by support brackets 168, 169 of the drive-side holding plate 112 and by corresponding support brackets 170, 171 formed in the output holding plate 130, respectively.

The support brackets 168, 169 of the drive-side holding plate 112 and the support brackets 170, 171 of the output-side holding plate 130 are axially spaced and opposed from one another respectively when the drive-side holding plate 112 and the output-side holding plate 130 are engaged to one another. This allows the support brackets 172 and 173 of the hub plate 113 to operatively move between opposed support brackets 168, 170 and 169, 171 of the holding plates 112 and 130 respectively, when the hub plate 113 (primary element) moves separately from the holding plates 112, 130 (second element).

In operation, with regard to the spring mechanism 199, the hub plate 113 of the torsional damper 100 receives a torque input from an output of a drive device. The hub plate 113 rotates such that one radial edge of each of the hub plate support brackets 172 and 173 comes in contact with the end-most coil spring sliding blocks at the ends of the two spring groups (116 and 118 for example). In response, the spring groups compress while transferring the imparted torque to the opposite end-most sliding blocks (117 and 119 in this example). The opposite end-most sliding blocks (117 and 119) press against the edges of the cooperative supports brackets 168, 169 of the drive-side holding plate 112 and the support brackets 170, 171 of the output-side holding plate 130 thereby causing the drive-side holding plate 112 and the output-side holding plate 130 to rotate. Thus, the second element (the drive-side holding plate 112 and the output-side holding plate 130) is driven by the primary element (hub plate 113) through the damping of the spring mechanism 199. Likewise, a reverse action of the spring mechanism 199 occurs to damp a feedback of torque from the secondary element to the primary element when drive torque is removed from the primary element and the secondary element still has continued rotational movement and inertia from the drive train.

Figure 3:
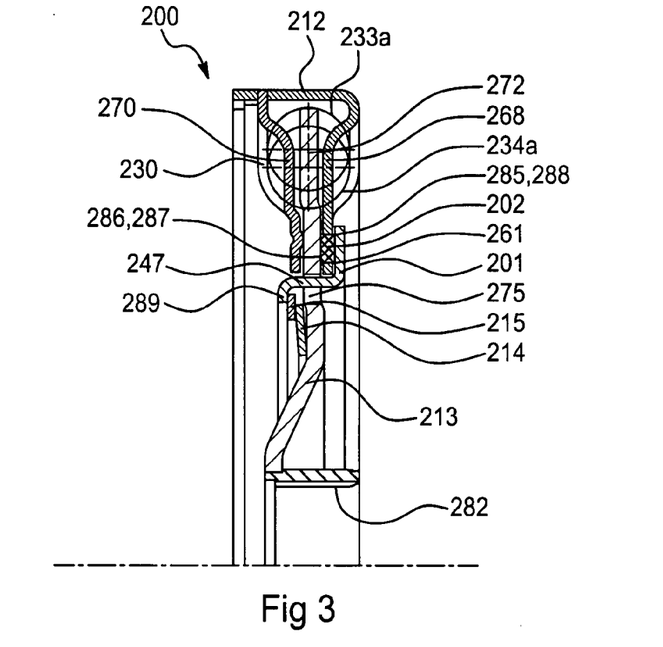
FIG. 3 is a radial half section of the torsional-vibration damper shown in FIG. 1A.
Figure 4:
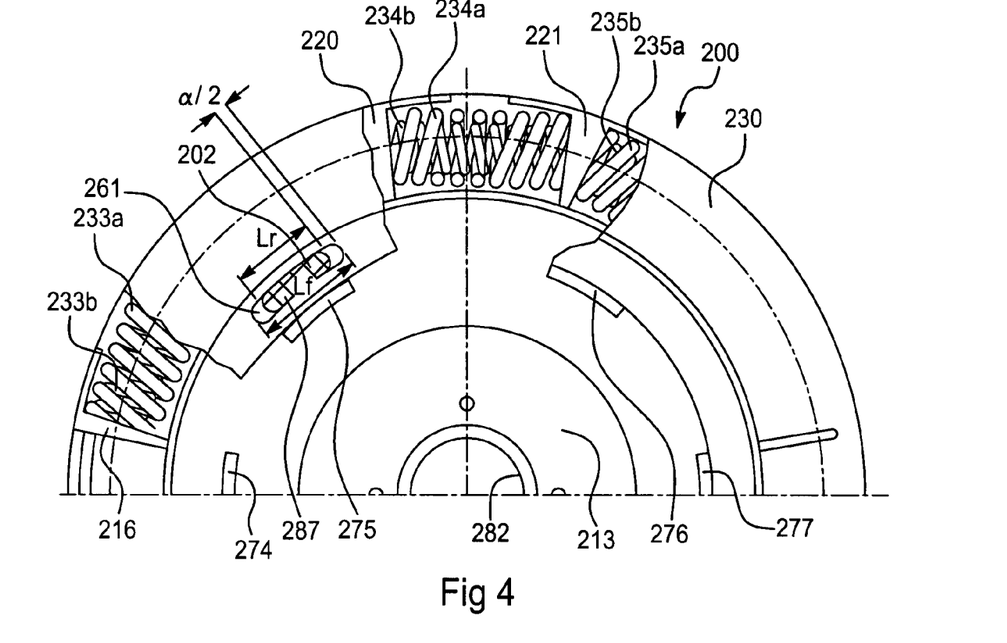
FIG. 4 is an axial half section of one embodiment of a spring mechanism that may be employed with the torsional-vibration damper shown in FIG. 1A.

Referring now to FIGS. 3 and 4, where like numerals increased by 100 are used to designate structure like that of FIGS. 1A, 1B, and 2, a second exemplary embodiment of a torsional-vibration damper in accordance with the present invention is generally indicated at 200. The torsional-vibration damper 200 comprises a drive-side holding plate 212 and an output-side holding plate 230, which together form the secondary element as well as a support plate 201, which forms a primary element together with a hub plate 213.

A plurality of friction blocks 202 are provided that are arranged in corresponding apertures 261 and are held in a frictionally engaged manner against the support plate 201 and the hub plate 213 by means of a disk spring 214 and a locking ring 215. The end surfaces 287 and 288 of the friction blocks 202 interact with corresponding friction surfaces 285 and 286 on the support plate 201 and the hub plate 213, respectively. The friction device in this example differs from that in FIGS. 1A and 2 in that the apertures 261 are not open on their inner diameter. Thus, the friction blocks 202 do not rest on the axially extending ridges 247 of the support plate 201, but are wholly fit within the slot-shaped apertures 261.

As shown in FIG. 4, torsional-vibration damper 200 also deviates from the previous exemplary embodiment by employing a different spring mechanism between the drive-side and output-side holding plates 112 and 130. The spring-elastic coupling provided in this example between the sliding blocks 216, 220, 221 is not accomplished using simple coil springs, but rather a coaxially arranged coil-spring pair, consisting of exterior springs 233a, 234a, 235a and interior springs 233b, 234b, 235b as shown. Additionally, FIG. 4 illustrates a rotationally neutral position with regard to the position of the friction block 202 within the aperture 216. The friction block 202 having a length $L_r$ that is smaller that the aperture length $L_f$ such that the clearance angle α is indicated as "α/2" on each side of the friction block 202.

Figure 5:
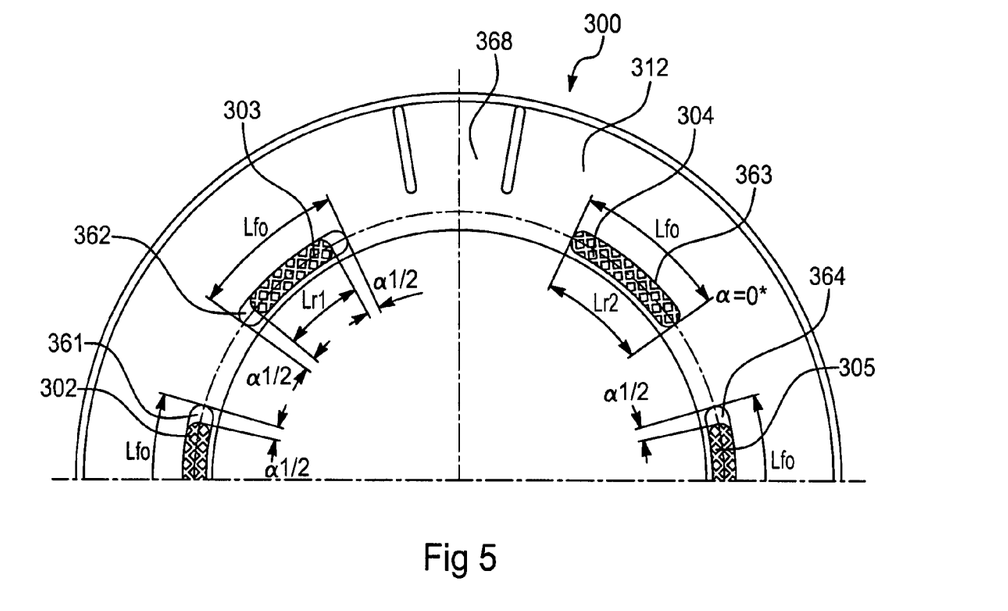
FIG. 5 is another embodiment of a drive-side holding plate that may be employed with the torsional-vibration damper shown in FIG. 1A.

Referring now to FIG. 5, where like numerals increased by 200 are used to designate structure like that of FIGS. 1A, 1B and 2, a third exemplary embodiment of a torsional-vibration damper in accordance with the present invention is generally indicated at 300. The torsional-vibration damper 300 comprises a drive-side holding plate 312 of the aforementioned type, which has apertures 361, 362, 363, 364. All of the apertures 361, 362, 363, 364 have the same radial length $L_{f0}$. Friction blocks 302, 303, 304, 305 with different friction-block lengths $L_{r1}$ and $L_{r2}$ are inserted into these apertures 361, 362, 363, 364. One of the friction blocks 304 has a friction-block length $L_{r2}$, which is identical to the window length $L_{f0}$. Three friction blocks 302, 303, and 305 have a friction-block length $L_{r1}$, which is smaller than the window length $L_{f0}$.

Figure 6:
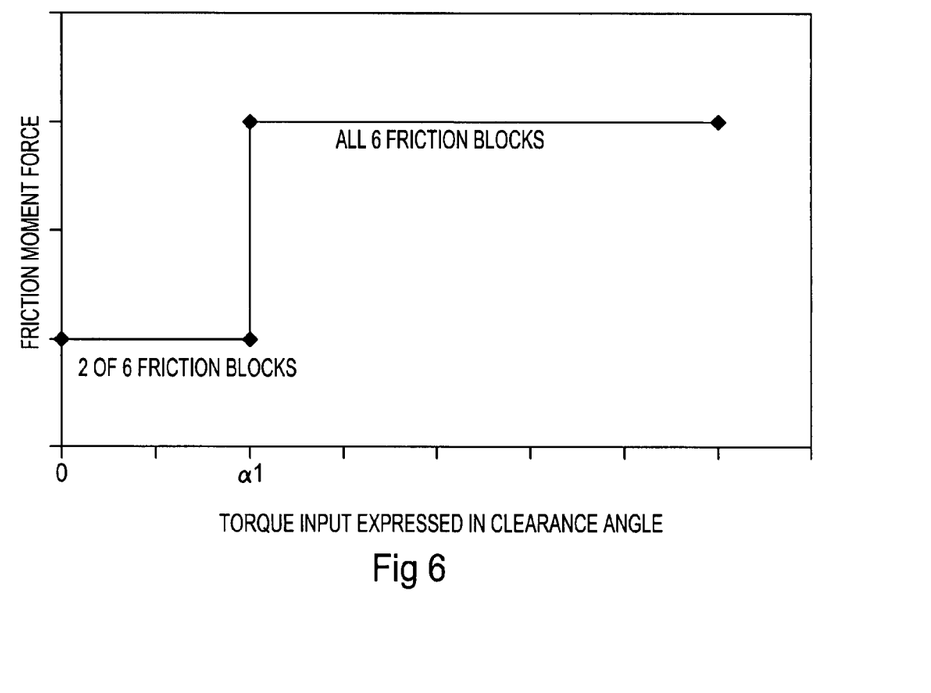
FIG. 6 is a graphic representation of the friction moment force of the torsional-vibration damper shown in FIG. 5.

The relative friction moment force output from torsional-vibration damper 300 having this particular type of friction device is graphically represented in FIG. 6. It should be appreciated that as configured in FIG. 5, the torsional-vibration damper 300 is symmetrical and also has two additional friction blocks that are not shown. Of these two additional friction blocks, one is of length $L_{r1}$ and the other is of length $L_{r2}$ such that, of the six friction blocks in this configuration, two are the same length as their respective apertures ($L_{r2}$) and four are shorter ($L_{r1}$). Therefore, as graphically represented in FIG. 6, when the hub plate 313 is moved rotationally and the clearance angle α is 0 degrees to one whole unit (horizontal axis), the relative frictional moment force (vertical axis) reflects the action of the two full length ($L_{r2}$) friction blocks. When hub plate 313 rotates further such that the clearance angle α exceeds the first unit of measure, the other four friction blocks (having $L_{r1}$ length) are brought into play and, as graphically represented, the frictional moment force increases.

Figure 7:
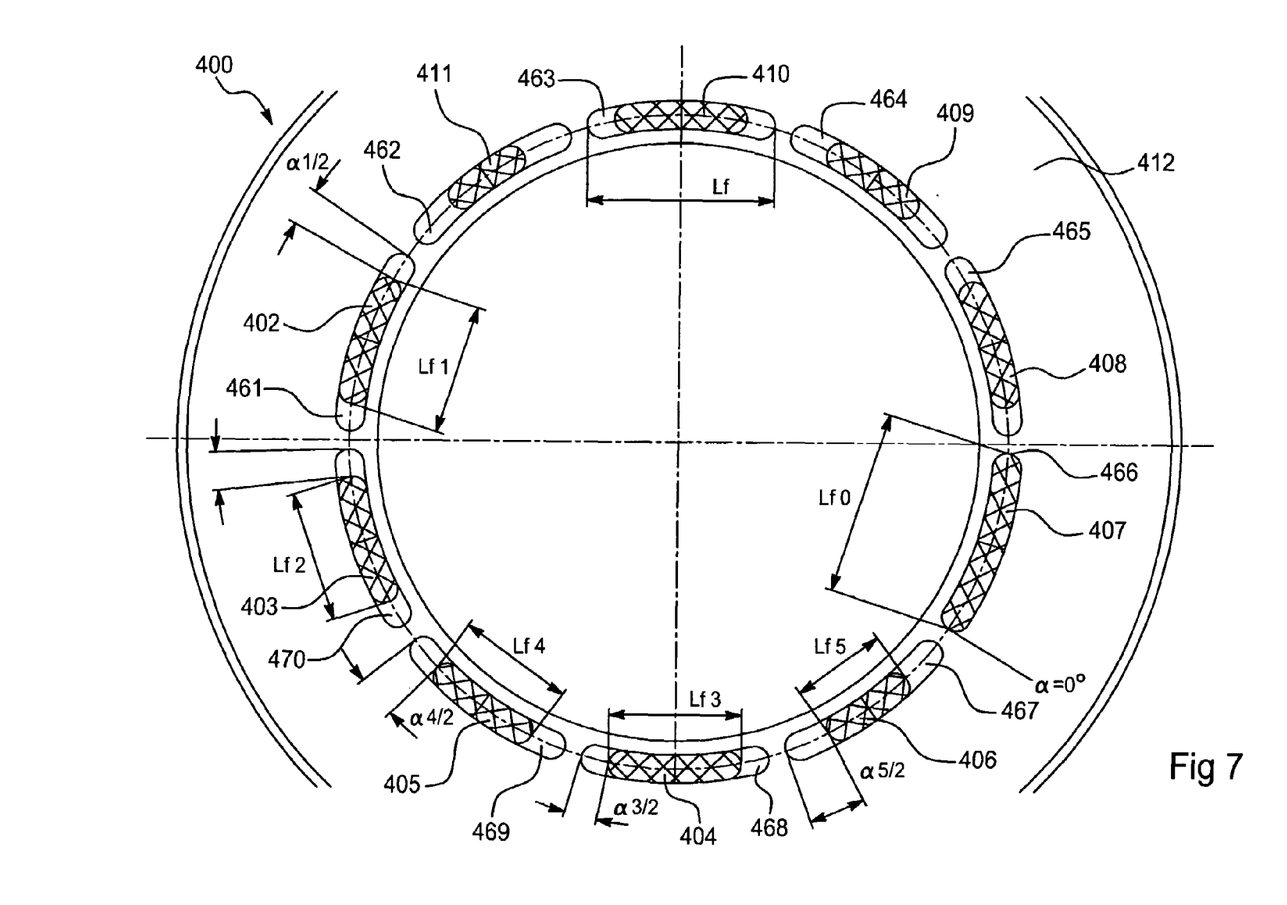
FIG. 7 is a another embodiment of a drive-side holding plate that may be employed with the torsional-vibration damper shown in FIG. 1A.

Referring now to FIG. 7, where like numerals increased by 300 are used to designate structure like that of FIGS. 1A, 1B, and 2, a fourth exemplary embodiment of a torsional-vibration damper in accordance with the present invention is generally indicated at 400. The torsional-vibration damper 400 comprises a drive-side holding plate 412 with ten apertures 461, 462, 463, 464, 465, 466, 467, 468, 469, 470, into which the friction blocks 402, 403, 404, 405, 406, 407, 408, 409, 410, 411 are inserted. In this exemplary embodiment, one uniform window length $L_f$ of the apertures 461, 462, 463, 464, 465, 466, 467, 468, 469, 470 was selected. The friction blocks 402, 403, 404, 405, 406, 407, 408, 409, 410, 411 have different friction-block lengths $L_{r0}$, $L_{r1}$, $L_{r2}$, $L_{r3}$, $L_{r4}$, $L_{r5}$, so that different clearance angles are created, which are labeled in the figure with the reference numbers $α_0$, $α_1$, $α_2$, $α_3$, $α_4$, $α_5$.

Figure 8:
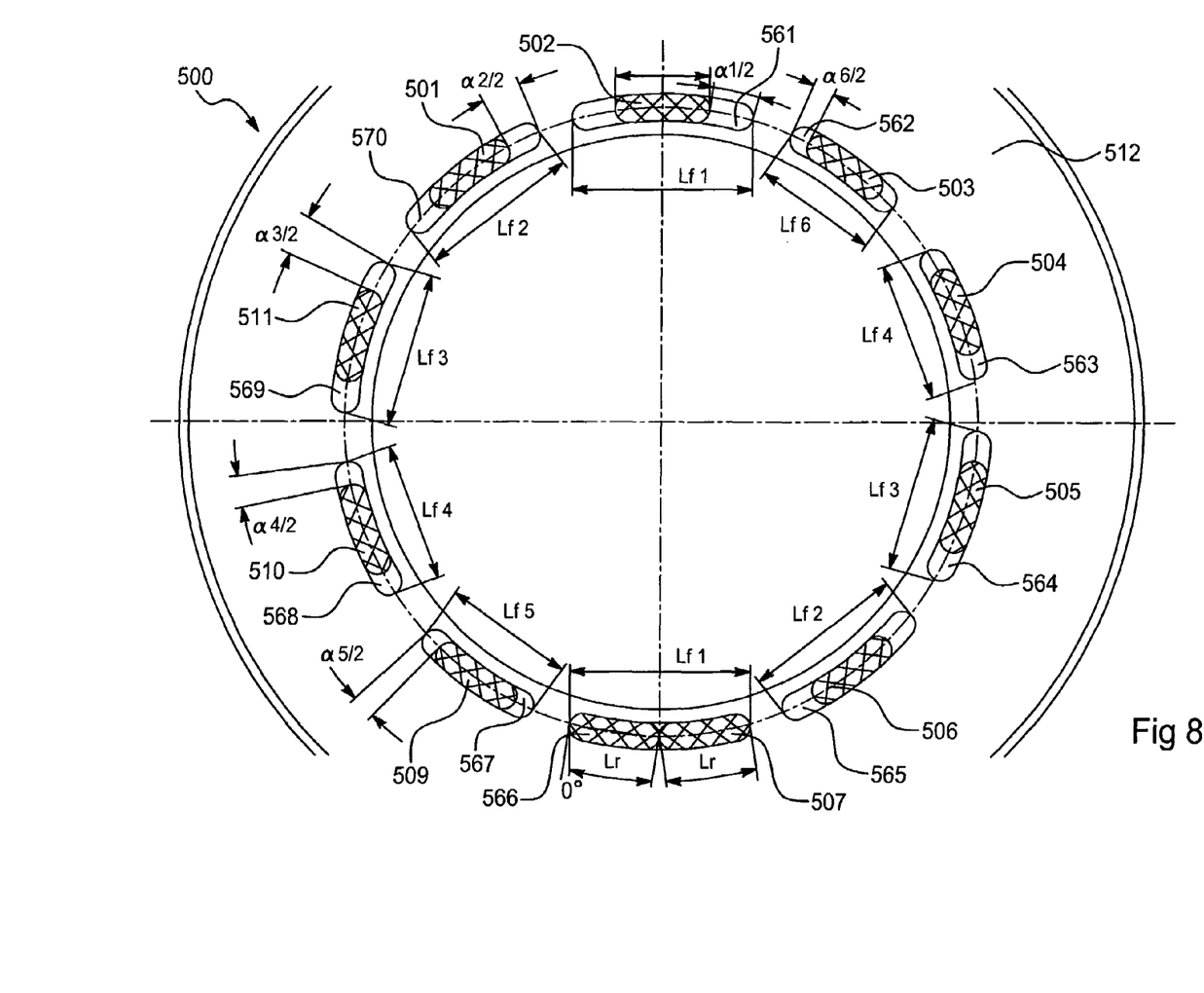
FIG. 8 is still another exemplary embodiment of a drive-side holding plate that may be employed with the torsional-vibration damper shown in FIG. 1A.

Referring now to FIG. 8, where like numerals increased by 400 are used to designate structure like that of FIGS. 1A, 1B, and 2, a fifth exemplary embodiment of a torsional-vibration damper in accordance with the present invention is generally indicated at 500. The torsional-vibration damper 500 comprises a drive-side holding plate 512 of a torsional-vibration damper. Apertures 561, 562, 563, 564, 565, 566, 567, 568, 569, 570 are provided with different window lengths $L_{f1}$, $L_{f2}$, $L_{f3}$, $L_{f4}$, $L_{f5}$, $L_{f6}$. Friction blocks 501, 502, 503, 504, 505, 506, 507, 508, 509, 510, 511 with uniform friction-blocks lengths $L_r$ are inserted into these apertures 561, 562, 563, 564, 565, 566, 567, 568, 569, 570. In this case, the friction-block length $L_r$ is just half the window length $L_{r1}$ of the crank opening 566. In this exemplary embodiment, two friction blocks 507, 508 are inserted into this crank opening 566. Thus, the friction power transmission here takes place free from play (clearance angle $α_0=0°$).

The torsional-vibration damper 100, 200, 300, 400 and 500 having the friction device of the present invention is simple and inexpensive to produce. Also, the size of the friction elements is easily changeable in production so that the predetermined relative friction moment force of the friction device is easily varied. In addition, the torsional-vibration damper of the present invention requires few separate components.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A torsional-vibration damper rotatably supported for translating torque between a power take-off of a prime mover and an input of a transmission, said torsional-vibration damper comprising:

a primary element operatively connected for rotation with the power take-off of the prime mover;

a secondary element operatively connected for rotation with the input of the transmission and including a drive-side holding plate on which a series of apertures and radial ridges are formed;

a spring mechanism operatively disposed between said primary element and said secondary element and adapted to operatively couple said primary element to said secondary element in a damped-torque translational relationship; and a friction device having a plurality of friction blocks that are adapted to be received within respective said apertures of said drive-side holding plate and operatively supported between said primary element and said secondary element such that said friction blocks provide frictional contact between said primary element and said secondary element, wherein said friction device further includes a support plate having a plurality of axially extending ridges and that is operatively mounted to said drive-side holding plate such that said plurality of axially extending ridges of said support plate fit within and extend axially beyond said drive-side holding plate and said plurality of friction blocks are operatively disposed upon respective said axially extending ridges of said support plate and can move within respective said apertures in a circumferential orientation to next corresponding said radial ridges of said drive-side holding plate.

2. A torsional-vibration damper as set forth in claim 1, wherein said friction blocks are of differing radial lengths to cause said frictional contact between said primary and said secondary element to increase as primary element rotationally moves with respect to said second element.

3. A torsional-vibration damper as set forth in claim 1, wherein said plurality of friction blocks are the same length with respect to each other and said plurality of apertures are the same length with respect to each other.

4. A torsional-vibration damper as set forth in claim 1, wherein said drive-side holding plate has an axial rim and said secondary element further includes an output-side holding plate mounted to said drive-side holding plate such that said primary element is operatively disposed within said drive-side holding plate, said spring mechanism being disposed between said output-side holding plate and said drive-side holding plate such that said spring mechanism is radially disposed and axially retained within an inside of said axial rim.

5. A torsional-vibration damper as set forth in claim 1, wherein said primary element is a hub plate, said hub plate and said support plate having friction surfaces with said plurality of friction blocks captured therebetween such that said friction surfaces frictionally interact with said friction blocks.

6. A torsional-vibration damper as set forth in claim 5, wherein said plurality of axially extending ridges of said support plate are turned radially inward at their ends to form radial support ridges and said hub plate further includes a plurality of slotted apertures adapted to receive said radial support ridges, said support plate further including a biasing member adapted to be fitted within said radial support ridges such that said biasing member causes said hub plate to be axially biased toward said support plate such that said friction surfaces frictionally interact with said friction blocks.

* * * * *